United States Patent
West

(10) Patent No.: US 6,410,632 B1
(45) Date of Patent: Jun. 25, 2002

(54) METHOD FOR SUSPENDING BORATE PARTICLES IN AQUEOUS DISPERSIONS

(76) Inventor: Michael Howard West, 54 S. Crockett Rd., Senatobia, MS (US) 38668

( * ) Notice: Subject to any disclaimer, the term of this patent is extended or adjusted under 35 U.S.C. 154(b) by 0 days.

(21) Appl. No.: 09/268,123

(22) Filed: Mar. 15, 1999

(51) Int. Cl.$^7$ .................................................. C08K 3/38
(52) U.S. Cl. ...................................... 524/405; 524/247
(58) Field of Search ................................ 524/405, 247

(56) References Cited

U.S. PATENT DOCUMENTS

| | | | | |
|---|---|---|---|---|
| 3,617,358 A | * | 11/1971 | Dittrich | 4117/447 |
| 3,785,860 A | * | 1/1974 | Zdanowski | 106/8 |
| 3,856,546 A | * | 12/1974 | Weiss | 106/300 |
| 3,956,206 A | * | 5/1976 | Sellars et al. | 26/17 R |
| 4,070,510 A | * | 1/1978 | Kahn | 427/385 R |
| 4,168,255 A | * | 9/1979 | Lewis et al. | 427/385 |
| 4,224,169 A | * | 9/1980 | Retana | 252/8.1 |
| 4,290,933 A | * | 9/1981 | Becker | 156/305 |
| 4,786,288 A | * | 11/1988 | Handa et al. | 8/495 |
| 5,071,478 A | * | 12/1991 | Avelar | 106/18.27 |
| 5,281,357 A | * | 1/1994 | Morgan et al. | 252/174.13 |
| 5,380,447 A | * | 1/1995 | Kirk et al. | 252/8.6 |
| 5,385,959 A | * | 1/1995 | Tsaur et al. | 523/201 |
| 5,658,430 A | * | 8/1997 | Drake, Jr. et al. | 156/71 |
| 5,849,387 A | * | 12/1998 | Drake, Jr. et al. | 428/86 |
| 6,162,850 A | * | 12/2000 | Boucher et al. | 524/405 |

* cited by examiner

Primary Examiner—Judy M. Reddick

(57) ABSTRACT

A method for suspending borate particles in aqueous dispersions which comprises blending in water 20 to 60 parts of sodium tetraborate decahydrate, with from 2 to 20 parts of an acrylic emulsion trade named Rhodoline 1560, and adjusting the pH between 7 and 12 using an alkaline reagent.

1 Claim, No Drawings

METHOD FOR SUSPENDING BORATE PARTICLES IN AQUEOUS DISPERSIONS

CROSS REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO A MICROFICHE APPENDIX

NOT APPLICABLE

BACKGROUND OF THE INVENTION

The subject matter of the claimed invention pertains to a method for suspending borate particles in aqueous dispersions; in other words a method for a stable aqueous borate formulation. The ability to prepare an aqueous formulation in which there is no settling is necessary in flowable chemistry.

Flowable formulation chemistry is widely practiced in the agricultural chemical industry where active chemicals have limited solubility in water. Liquid chemical formulations are preferred to crystals and powders for many reasons not the least of which is easier handling of liquids.

The borate chemical claimed—sodium tetraborate decahydrate, is marketed as crystal or powder formulations. There have been many attempts to produce aqueous flowable borate compositions using techniques and reagents known to those skilled in the art of agricultural flowable chemistry. None of these attempts achieved commercial success because the techniques and reagents used did not prevent the borate particles from settling in aqueous dispersion.

The suspending reagent claimed, an acrylic emulsion trade named Rhodoline 1560, is marketed as a thickening agent for use in paints. It is known to increase the viscosity of paint formulations when the pH in those compositions is greater than 7. Rhodoline 1560 is marketed by Rhodia, 259 Prospect Plains Road, Cranbury, N. J. 08512.

BRIEF SUMMARY OF THE INVENTION

My invention teaches a method for suspending borate particles in aqueous dispersions which comprises blending in water 20 to 60 parts of a borate compound consisting of sodium tetraborate decahydrate, with from 2 to 20 parts of an acrylic emulsion trade named Rhodoline 1560, then adjusting the pH between 7 and 12 using an alkaline reagent. It is the object of my invention to provide a method for preparing aqueous borate formulations which are sufficiently free of settling to be marketed as liquid flowable compositions.

DETAILED DESCRIPTION OF THE INVENTION

In the preferred embodiment of my invention the borate compound, the Rhodoline 1560, and the alkaline reagent are chosen and used at concentrations within the limits claimed so as to produce a dispersion which handles easily through commercial pumps in addition to resisting settling. Those skilled in the art will understand the possibility of including chemicals in additions to those claimed in these formulations. In the preferred embodiment, preparation of dispersions according to the method of my invention is accomplished by adding water first, the borate compound second, the Rhodoline 1560 third, and finally the alkaline reagent, all while blending the mixture.

Any borate crystal or powder formulation may be used in the preparation; but powders produce more free flowing dispersions. The alkaline reagent may be a pure chemical or a mixture. Sodium hydroxide and ethanolamine are preferred alkaline reagents because of their availability and relatively low cost. The preparations according to my method invention are used in the same manner and for the same purposes as the borate crystals or powders from which they are prepared.

The following example illustrates suspending borate particles in aqueous dispersions.

EXAMPLE 1

Forty-eight parts water, 40 parts crystal sodium tetraborate decahydrate, 5 parts Rhodoline 1560, and 7 parts of 85% ethanolamine were blended together in the order listed to form a stable dispersion with a pH approximately 11.

I claim:

1. A method for suspending borate particles in aqueous dispersions which comprises blending in water, based on total composition, by weight, 20 to 60 parts of sodium tetraborate decahydrate with from 2 to 20 parts of an acrylic emulsion and adjusting the pH between 7 and 12 with an alkaline reagent comprising ethanolamine.

* * * * *